US011868707B2

(12) United States Patent
Liao

(10) Patent No.: US 11,868,707 B2
(45) Date of Patent: Jan. 9, 2024

(54) INFORMATION INTERACTION METHOD AND APPARATUS, SERVER, SYSTEM, AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/883,774

(22) Filed: Aug. 9, 2022

(65) Prior Publication Data

US 2022/0391577 A1 Dec. 8, 2022

Related U.S. Application Data

(63) Continuation of application No. PCT/CN2021/089586, filed on Apr. 25, 2021.

(30) Foreign Application Priority Data

Apr. 30, 2020 (CN) .......................... 202010366992.5

(51) Int. Cl.
*G06F 40/166* (2020.01)
*G06F 40/194* (2020.01)
*G06F 40/103* (2020.01)
*G06F 9/54* (2006.01)

(52) U.S. Cl.
CPC ............ *G06F 40/166* (2020.01); *G06F 9/546* (2013.01); *G06F 40/103* (2020.01); *G06F 40/194* (2020.01)

(58) Field of Classification Search
CPC .................................................... G06F 40/166
See application file for complete search history.

(56) References Cited

U.S. PATENT DOCUMENTS

| 11,528,246 B2* | 12/2022 | VanBlon et al. ....... H04L 51/234 |
| 2005/0033811 A1 | 2/2005 | Bhogal et al. |
| 2013/0117376 A1 | 5/2013 | Filman et al. |
| 2014/0372855 A1 | 12/2014 | Myerscough et al. |
| 2016/0182412 A1* | 6/2016 | Kabbes et al. ........ H04L 51/046 |

(Continued)

FOREIGN PATENT DOCUMENTS

| CN | 102204194 A | 9/2011 |
| CN | 102520922 A | 6/2012 |

(Continued)

OTHER PUBLICATIONS

Office Action dated Apr. 6, 2022 for CN Application No. 202010366992.5 (20 Pages).

(Continued)

*Primary Examiner* — James J Debrow

(57) ABSTRACT

An information interaction method and apparatus, a server, a system, and a storage medium are provided. The method includes: receiving first text information sent by a second server, and generating second text information according to the first text information; updating the second text information in response to receiving an editing instruction sent by a client of a user; and sending updated content of the second text information to the client of each user, such that the client of each user updates the first text information according to the updated content.

15 Claims, 5 Drawing Sheets

(56) References Cited

U.S. PATENT DOCUMENTS

| | | |
|---|---|---|
| 2016/0285702 A1 | 9/2016 | Beausoleil et al. |
| 2017/0052912 A1* | 2/2017 | Canepa et al. ........ G06F 13/362 |
| 2018/0048605 A1* | 2/2018 | Amemiya et al. ...... H04L 29/08 |
| 2019/0007359 A1 | 1/2019 | Lin et al. |
| 2019/0272071 A1 | 9/2019 | Greenberger et al. |
| 2019/0340527 A1 | 11/2019 | Liden et al. |

FOREIGN PATENT DOCUMENTS

| | | |
|---|---|---|
| CN | 103854168 A | 6/2014 |
| CN | 105593848 A | 5/2016 |
| CN | 107431631 A | 12/2017 |
| CN | 108234280 A | 6/2018 |
| CN | 109218165 A | 1/2019 |
| CN | 109543163 A | 3/2019 |
| CN | 109688052 A | 4/2019 |
| CN | 110765744 A | 2/2020 |
| CN | 110909521 A | 3/2020 |
| CN | 110958173 A | 4/2020 |
| WO | 2012137215 A1 | 10/2012 |

OTHER PUBLICATIONS

Search Report dated Jul. 21, 2021 for PCT Application No. PCT/CN2021/089586 (12 Pages).

Chandra, Surendar, "Moderated Group Authoring System for Campus-Wide Workgroups," IEEE Transactions on Mobile Computing, vol. 11, No. 6, Jun. 2012 (14 pages).

Extended European Search Report and Search Opinion dated Aug. 9, 2023 in European Application No. 21797545.7 (11 pages).

First Office Action dated Oct. 10, 2023 in Japanese Application No. 2022-564516, with English translation (16 pages).

* cited by examiner

INFORMATION INTERACTION METHOD AND APPARATUS, SERVER, SYSTEM, AND STORAGE MEDIUM

This application is a continuation of International Application No. PCT/CN2021/089586, filed on Apr. 25, 2021, which claims the priority to Chinese Patent Application No. 202010366992.5 titled "INFORMATION INTERACTION METHOD AND APPARATUS, SERVER, SYSTEM, AND STORAGE MEDIUM", filed on Apr. 30, 2020 with the China National Intellectual Property Administration (CNIPA), both of which are incorporated herein by reference in entireties.

FIELD

The present disclosure relates to the technical field of communications, and in particular to a method and an apparatus for exchanging information, a server, a system and a storage medium.

BACKGROUND

Currently, various communication methods or media are involved in the field of communication technologies. For example, a mail server may provide services for implementing functions related to mails, and a document server may provide services for implementing functions related to document editing.

In a process of implementing the present disclosure, the inventor found that in some implementations of the above communication methods, the amount of data for each server surges with longer communication time. Therefore, processing efficiency of each server is reduced, and the requirements of users cannot be met.

SUMMARY

A method and an apparatus for exchanging information, a server, a system and a storage medium are provided according to embodiments of the present disclosure, to achieve collaboration of a mail and a document.

A method for exchanging information is provided according to a first aspect of the present disclosure. The method includes:
receiving first text information sent by a second server;
generating second text information based on the first text information;
updating, in response to receiving an editing instruction sent by a client device of a user, the second text information; and
sending updates of the second text information to a client device of each user, to enable the client device of each user to update the first text information according to the updates.

Another method for exchanging information is provided according to a second aspect of the present disclosure. The method includes:
determining first text information according to a text identity sent by a client device of a user; and
sending the first text information to a first server, to enable the first server to generate second text information based on the first text information, update the second text information in response to receiving an editing instruction sent by a client device of a user, and send updates to a client device of each user for updating and displaying.

An apparatus for exchanging information is further provided according to a third aspect of the present disclosure. The apparatus includes:
a first text information acquisition module, configured to receive first text information sent by a second server;
a second text information generation module, configured to generate second text information based on the first text information;
a second text information update module, configured to update, in response to receiving an editing instruction sent by a client device of a user, the second text information; and
a second text information sending module, configured to send updates of the second text information to a client device of each user, to enable the client device of each user to update the first text information according to the updates.

An apparatus for exchanging information is further provided according to a fourth aspect of the present disclosure. The apparatus includes:
a first text information determination module, configured to determine first text information according to a text identity sent by a client device of a user; and
a first text information sending module, configured to send the first text information to a first server, to enable the first server to generate second text information based on the first text information, update the second text information in response to receiving an editing instruction sent by a client device of a user, and send updates to a client device of each user for updating and displaying.

A first server is provided according to a fifth aspect of the present disclosure. The first server includes one or more processors; and a memory for storing one or more programs, where the one or more processors, when executing the one or more programs, perform the method according to any one of the embodiments.

A second server is provided according to a sixth aspect of the present disclosure. The second server includes
one or more processors; and
a memory for storing one or more programs, where the one or more processors, when executing the one or more programs, perform the method according to any one of the embodiments.

A system for exchanging information is further provided according to a seventh aspect of the present disclosure. The system includes at least the first server and the second server described above. The first server is in communication connection with the second server.

A computer-readable storage medium is further according to an eighth aspect of the present disclosure. The computer-readable storage medium stores a computer program. The computer program, when being executed by a processor, performs the method according to any one of the embodiments.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

DETAILED DESCRIPTION

Figure 1:
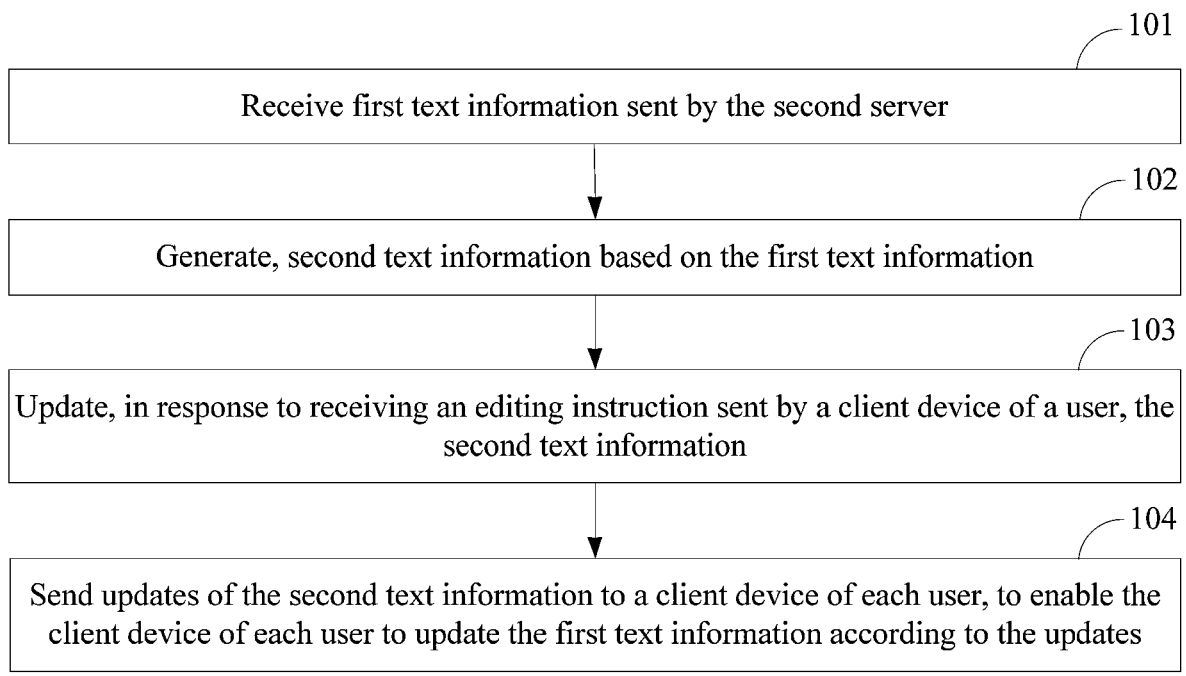
FIG. 1 is a schematic flow chart of a method for exchanging information according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different devices, modules or units, and are not used to limit sequential order or interdependence of the functions performed by the devices, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

In the process of implementing the present disclosure, the applicant found that in some implementations, if a mail server is only used to provide services for implementing functions related to mails, or a document server is only used to provide services for implementing functions related to document editing, the amount of data for each server surges with longer communication time. Therefore, processing efficiency of each server is reduced, and the requirements of users cannot be met. In view of this, in some embodiments of the present disclosure, the mail server operates in cooperation with the document server, so that different servers can achieve information exchange and information fusion, improving the information processing efficiency of each server, so as to meet the requirements of users.

First Embodiment

FIG. 1 is a schematic flow chart of a method for exchanging information according to a first embodiment of the present disclosure. The embodiment of the present disclosure may be applied to a case where a first server operates in cooperation with a second server. The method may be implemented by an apparatus for exchanging information according to an embodiment of the present disclosure. The apparatus may be implemented in a form of software and/or hardware, and may generally be integrated in a computer device. In addition, in the embodiment, the first server is a document server, and the second server is a mail server. In the subsequent description, the document server is taken as a representative of the first server, and the mail server is taken as a representative of the second server. The method according to the embodiment of the present disclosure is as follows.

As shown in FIG. 1, the method according to the embodiment of the present disclosure includes the following steps 101 to 104.

In step 101, first text information sent by the second server is received.

In an embodiment, the first text information may include a mail draft, and second text information may include a shared document. In the following description, the mail draft is taken as a representative of the first text information, and the shared document is taken as a representative of the second text information.

The embodiment may be applied to a case where an organizer invites multiple collaborators to edit specified first text information (that is, a mail draft), in which a client device of the organizer receives a sharing operation or a forwarding operation from the organizer, so that client devices of the multiple collaborators may also acquire the mail draft.

It should be noted that in a case that client device of the organizer shares the mail draft to multiple shared users (that is, the multiple collaborators) on receipt of the sharing operation from the organizer, identities of the collaborators are not limited, that is, the collaborators may be in a recipient list of the mail draft or not in the recipient list of the mail draft. As long as the collaborators receive the mail draft shared by the organizer, the collaborators are allowed to view relevant information of the mail draft, such as information about at least one of: an address bar, a mail title, an attachment and a mail body in the mail draft.

The mail server is in communication connection with client devices of multiple users. The number of the users is not limited in the embodiment. The mail draft sent by the mail server may be determined according to a mail identity sent by the client device. For example, the mail server acquires a mail identity 001 from the client device, determines a mail draft corresponding to the mail identity 001 by querying from a database, and sends the mail draft to the document server. At this time the document server receives the mail draft.

It should be noted that in the embodiment, the document server may receive the mail draft sent by the mail server in a wired way or a wireless way. The wireless way includes blue-tooth transmission, wireless fidelity (Wi-Fi) transmission or microwave transmission. Any transmission way that can ensure that the document server receives the mail draft sent by the mail server falls within the protection scope of the present disclosure. The transmission way is not limited in the embodiments of the present disclosure.

It should be noted that the mail draft in the embodiment may be a written mail or a blank mail without content. The content in the mail draft is not limited in the embodiment.

In step 102, the second text information is generated based on the first text information.

It should be noted that the document server generates, on receipt of the mail draft, the second text information (that is, a shared document) according to the mail draft. For example, the document server converts the mail draft into an editable document, for example, converts all elements in the mail draft, such as the address bar, the mail title, the attachment and the mail body to be in an editable state. In the shared document, these elements may be modified according to an editing instruction of the user.

It should be noted that the mail server may create, in response to a collaborative editing request sent by the client device of the user, a synchronous editing interface including the mail draft and send the synchronous editing interface to a client device of each user. Therefore, a current state of the shared document may be displayed in the synchronous editing interface on client device of each user.

In step 103, the second text information is updated in response to receiving the editing instruction sent by the client device of the user.

In an embodiment, the editing instruction may include editing content and a specified edit location, and the process in step 103 may include extracting, in response to receiving the editing instruction sent by the client device of the user, the editing content and the specified edit location from the editing instruction; and updating the shared document according to the editing content and the specified edit location.

The client device in the embodiment refers to a mail client.

In an embodiment, the updating the shared document according to the editing content and the specified edit location may include: adding the editing content at the specified edit location of the shared document to update the shared document, where the specified edit location includes at least one of the address bar, the mail title, the attachment and the mail body of the mail draft.

The editing instruction received by the document server from the client device of the mail may be generated when the mail client of the user detects that the user performs an editing operation on the mail draft in the synchronous editing interface. The editing instruction includes the editing content and the specified edit location. For example, if an underlined comment "please modify to the meeting arrangement about the year-end report" is added to the mail title of "meeting arrangement", the document server extracts the editing content, namely "please modify to the meeting arrangement about the year-end report", from the editing instruction, and extracts the specified edit location, namely "mail title", from the editing instruction. Therefore, according to the editing content, the underlined comment "please modify to the meeting arrangement for the year-end report" may be added to the mail title in the shared document. In addition, the underlined comment in the embodiment is only an example of editing, and the specific implementation of the editing is not limited in the embodiment.

In step 104, updates of the second text information is sent to the client device of each user, to enable the client device of each user to update the first text information according to the updates.

In an embodiment, sending the updates of the second text information to the client device of each user may include: converting the updates of the second text information according to a preset data format, to make the converted updates of the shared document in conformity with a data format in which the first server communicates with the client device; and sending the converted updates of the shared document to the client device of each user.

It should be noted that after the shared document is updated according to the editing instruction, the updates may be sent to the client device of each user being in communication connection with the document server. For example, the updates of the shared document are converted according to the preset data format. The preset data format may be the json data format or the data format of protocol buffers, so that the updates can be converted into a data receiving format matched for the document server. After conversion, a long link mode, such as Transmission Control Protocol (TCP), may be adopted, or a short link mode, such as Hypertext Transfer Protocol (HTTP) and Representational State Transfer (REST) protocol, may be adopted. The mode for sending the converted updates of the shared document to the client device of each user in not limited in the embodiment.

It should be noted that on receipt of the updates sent by the document server, the client device of each user may update the mail draft in the synchronous editing interface according to the updates.

In an embodiment, the editing instruction may further include a user identity. Before updating the second text information, the method according to the embodiment of the present disclosure may further include: extracting the user identity from the editing instruction; sending the user identity to the mail server, to cause the mail server to authenticate the user identity; and updating, in response to an authentication pass instruction sent by the second server, the shared document.

The editing instruction in the embodiment may further include the user identity. Since different users are assigned with different editing permissions for the mail draft, the document server first calls an interface of the mail server to authenticate an identity of a user before updating the shared document according to the editing instruction. For example, the organizer (that is, the user who initiated collaborative editing through the client device) may modify all contents of the mail draft, while the collaborator (that is, a user invited by the organizer to make collaborative editing) may only modify the body of the mail draft. Based on this, in a case that the document server extracts a user identity "Zhang San" from the editing instruction and sends the user identity "Zhang San" to the mail server, the mail server is required to authenticate the user identity "Zhang San". In such case, if the editing content in the editing instruction is that the underlined comment "please modify to the meeting arrangement about the year-end report" is added to the mail title of "meeting arrangement", and it is authenticated that the user "Zhang San" is the organizer who is allowed to edit the mail title, then it may be determined that the authentication is passed, and the authentication pass instruction is sent to the document server, so that the document server can update the shared document according to the received authentication pass instruction.

In an embodiment, the method according to the embodiment of the present disclosure further includes: receiving a mail sharing end instruction sent by the second server, and sending, in response to the mail sharing end instruction, a current mail draft to a client device of a user initiating the sharing.

It should be noted that when the organizer ends the sharing of the mail draft, the client device of the organizer generates, in respond to a sharing end operation triggered by the organizer, the sharing end instruction, and sends the sharing end instruction to the document server through the mail server. On receipt of the mail sharing end instruction sent by the client device of the organizer through the mail server, the document server may send, in response to the mail sharing end instruction, the current mail draft (that is, the mail draft having subjected to collaborative editing) to the client device of the user initiating the sharing (that is, the organizer).

In the method for exchanging information according to the embodiment of the present disclosure, the first server operates in cooperation with the second server, so that different servers can achieve information exchange and information fusion, improving the information processing efficiency of each server, so as to meet the requirements of users.

Second Embodiment

Figure 2:
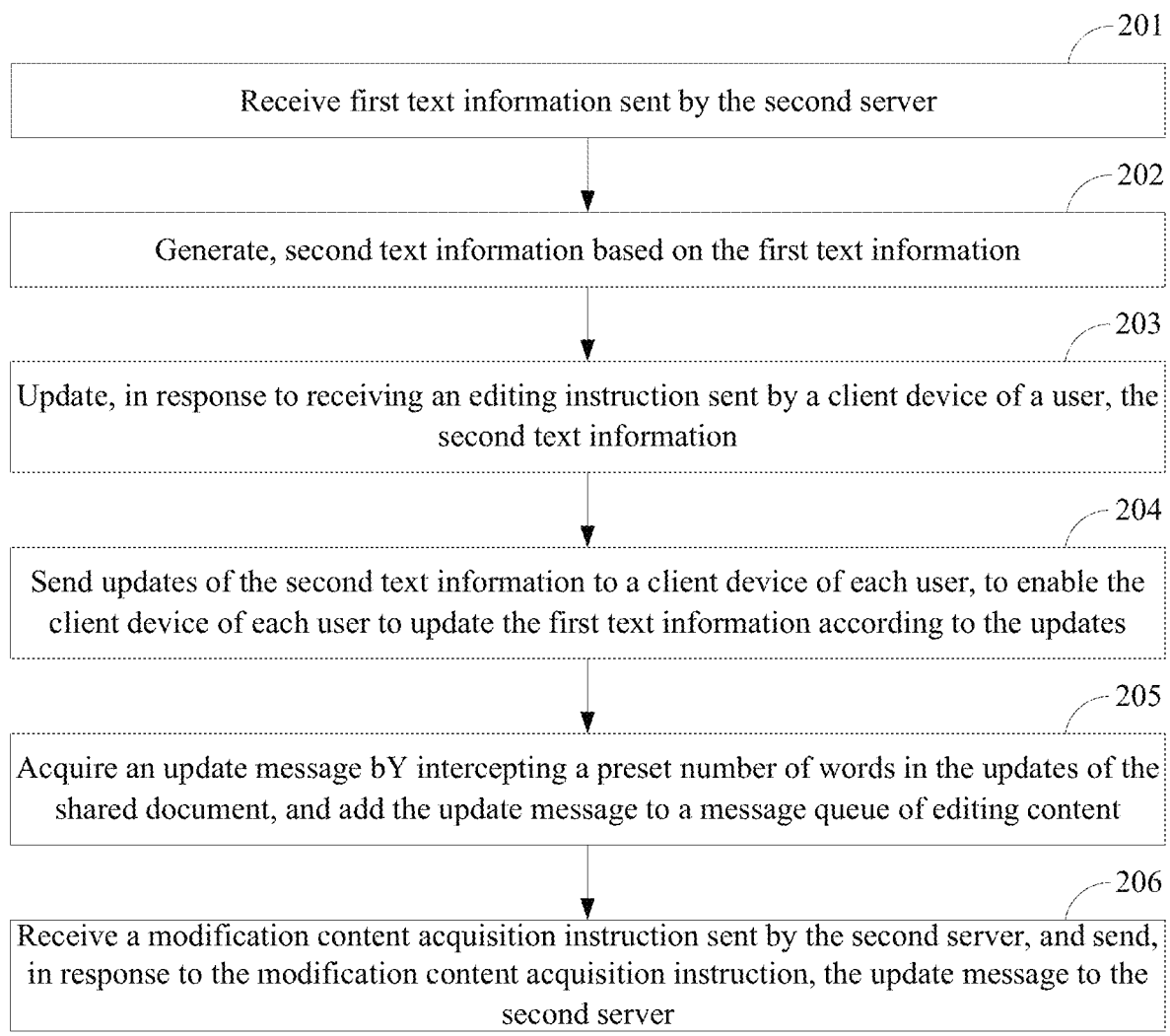
FIG. 2 is a schematic flow chart of a method for exchanging information according to a second embodiment of the present disclosure.

FIG. 2 is a schematic flow chart of a method for exchanging information according to a second embodiment of the present disclosure. The embodiment may be combined with the technical solutions of the above embodiments. In the embodiment of the present disclosure, after the second text information is updated in response to receiving the editing instruction sent by the client device of the user in the first embodiment, the method further includes: acquiring an update message by intercepting a preset number of words in the updates of the shared document, and adding the update message to a message queue of the editing content; receiving a modification content acquisition instruction sent by the second server; and sending, in response to the modification content acquisition instruction, the update message to the second server.

As shown in FIG. 2, the method according to the embodiment of the present disclosure includes the following steps 201 to 206.

In step 201, first text information sent by the second server is received.

In an embodiment, the first text information may include a mail draft, and second text information may include a shared document. In the following description, the mail draft is taken as a representative of the first text information, and the shared document is taken as a representative of the second text information.

In step 202, the second text information is generated based on the first text information.

In step 203, the second text information is updated in response to receiving the editing instruction sent by the client device of the user.

In an embodiment, the editing instruction may include editing content and a specified edit location, and the process of step 203 may include extracting, in response to receiving the editing instruction sent by the client device of the user, the editing content and the specified edit location from the editing instruction; and updating the shared document according to the editing content and the specified edit location.

In an embodiment, the updating the shared document according to the editing content and the specified edit location may include: adding the editing content at the specified edit location of the shared document to update the shared document, where the specified edit location includes at least one of the address bar, the mail title, the attachment and the mail body of the mail draft.

In step 204, updates of the second text information is sent to the client device of each user, to enable that the client device of each user to update the first text information according to the updates.

In an embodiment, sending the updates of the second text information to the client device of each user may include: converting the updates of the second text information according to a preset data format, to make the converted updates of the shared document in conformity with a data format in which the first server communicates with the client device; and sending the converted updates of the shared document to the client device of each user.

In an embodiment, the editing instruction may further include a user identity. Before updating the second text information, the method according to the embodiment of the present disclosure may further include: extracting the user identity from the editing instruction; sending the user identity to the mail server to cause the mail server to authenticate the user identity; and updating, in response to an authentication pass instruction sent by the second server, the shared document.

In an embodiment, the method according to the embodiment of the present disclosure further includes: receiving a mail sharing end instruction sent by the second server, and sending, in response to the mail sharing end instruction, a current mail draft to a client device of a user initiating the sharing.

In step 205, an update message is acquired by intercepting a preset number of words in the updates of the shared document, and the update message is added to a message queue of the editing content.

For example, the document server according to the embodiment further acquires the update message by intercepting the preset number of words in the updates of the second text information, namely, the shared document. For example, assuming that the updates of the shared document is "information about the transfer of a second group of personnel in the software development department", the first ten words in the updates "about the software development department" may be intercepted as the update message, and the update message may be added to the message queue of the editing content for saving. The message queue of the editing content is used to save the update message acquired at each time instant in real time.

It should be noted that the embodiment is illustrated with an example that the first ten words of the updates are intercepted. The number of words is not limited in the embodiment.

In step 206, the modification content acquisition instruction sent by the second server is received, and the update message is sent to the second server in response to the modification content acquisition instruction.

The modification content acquisition instruction is generated when the second server detects that the update message is added to the message queue of the editing content.

In the embodiment, when the document server updates the shared document, the mail server monitors the message queue in the document server. When it is detected that an update message is added to the message queue of the editing content, the modification content acquisition instruction is generated and sent to the document server.

It should be noted that the mail server in the embodiment may regularly monitor the message queue, generate the modification content acquisition instruction when detecting that the message queue is updated, and then send the modification content acquisition instruction to the document server, so as to save the power consumption of the mail server. The manner for generating the modification content acquisition instruction is not limited in the embodiment.

On receipt of the update message, the mail server in the embodiment sends the update message to the client device of each user, and the update message is displayed at a location of subject of the mail draft in a mail list, so that the user can quickly find a current modification location in the mail draft according to the displayed update message.

In the method for exchanging information according to the embodiment of the present disclosure, the first server operates in cooperation with the second server, so that different servers can achieve information exchange and information fusion, improving the information processing efficiency of each server, so as to meet the office requirements of users. Further, the update message is sent to the client device of each user through the mail server in response to the modification content acquisition instruction, and the update message is displayed on the client device of each user, so that the users can quickly find the current modification location in the mail draft according to the displayed update message, thereby further improving the user experience effect.

Example 3

Figure 3:
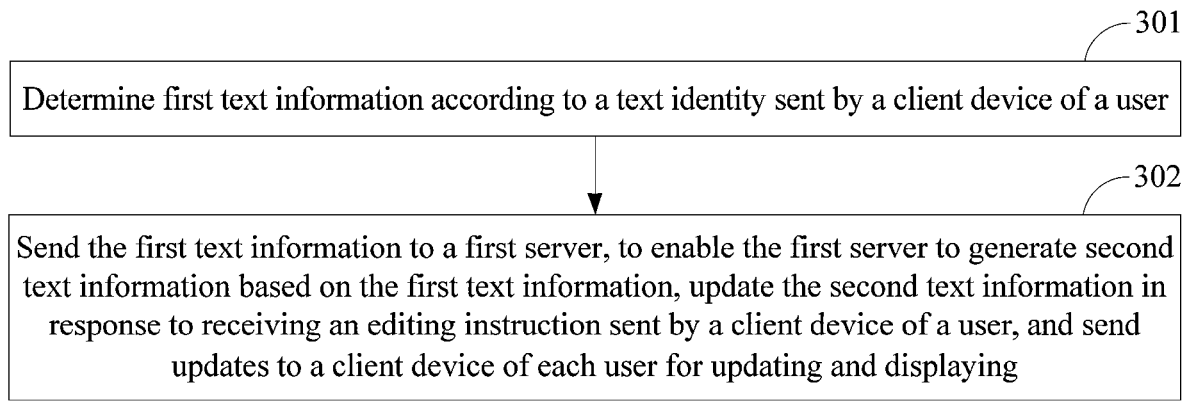
FIG. 3 is a schematic flow chart of a method for exchanging information according to a third embodiment of the present disclosure.

FIG. 3 is a schematic flow chart of a method for exchanging information according to a third embodiment of the present disclosure. The embodiment of the present disclosure may be applied to a case where a first server operates in cooperation with a second server. The method may be implemented by an apparatus for exchanging information according to an embodiment of the present disclosure. The apparatus may be implemented in a form of software and/or hardware, and may generally be integrated in a computer device. In addition, in the embodiment, the first server is a document server, and the second server is a mail server. In the subsequent description, the document server is taken as a representative of the first server, and the mail server is taken as a representative of the second server. The method according to the embodiment of the present disclosure is as follows.

As shown in FIG. 3, the method according to the embodiment of the present disclosure includes the following steps 301 and 302.

In step 301, first text information is determined according to a text identity sent by a client device of a user.

In an embodiment, the first text information may include a mail draft, and second text information may include a shared document. In the following description, the mail draft is taken as a representative of the first text information, and the shared document is taken as a representative of the second text information.

The embodiment may be applied to a case where an organizer invites multiple collaborators to edit a specified mail draft, in which a client device of the organizer receives a sharing operation or a forwarding operation from the organizer, so that client devices of the multiple collaborators may also acquire the mail draft. The mail server is in communication connection with client devices of multiple users. In the embodiment, the text identity sent by the client device may be the mail identity. For example, the client device of the organizer sends a mail identity 001 to the mail server, and the mail server determines a mail draft corresponding to the mail identity 001 by querying from a database and determines the mail draft as the first text information.

In step 302, the first text information is sent to the first server, to enable the first server to generate the second text information based on the first text information. The second text information is updated in response to receiving an editing instruction sent by the client device of the user, and updates are sent to a client device of each user for updating and displaying.

In the embodiment, the mail server sends the determined mail draft to the document server. Further, the mail server may send the mail draft to the document server in a wired way or a wireless way. The wireless way includes blue-tooth transmission, wireless fidelity (Wi-Fi) transmission or microwave transmission. Any transmission way that can ensure that the document server receives the mail draft sent by the mail server falls within the protection scope of the present disclosure. In addition, the mail draft may be a written mail or a blank mail without content.

It should be noted that the document server in the embodiment generates a shared document according to the received mail draft, and update, in response to receiving the editing instruction sent by the client device of the user, the second text information. For the specific operation principle of the document server, reference is made to the first embodiment and the second embodiment, and the operation principle of the document server is not repeated in this embodiment of the present disclosure.

In an embodiment, the method according to the embodiment of the present disclosure further includes: sending, on receipt of a mail sharing end instruction sent by the client device of the user, the mail sharing end instruction to the first server, to enable the first server to send, in response to the mail sharing end instruction, a current mail draft to a client device of a user initiating the sharing, and delete an update message recorded in a message queue of editing content.

When the organizer ends the sharing of the mail draft, the client device of the organizer generates, in respond to a sharing end operation triggered by the organizer, the sharing end instruction. The mail server receives the sharing end instruction sent by the client device of the organizer, and sends the sharing end instruction to the document server. The document server sends, in response to the mail sharing end instruction, the current mail draft to the client device of the user initiating the sharing, and deletes the update message recorded in the message queue, to save the storage space of the document server and reduce the storage pressure of the document server.

In the method for exchanging information according to the embodiment of the present disclosure, the first server operates in cooperation with the second server, so that different servers can achieve information exchange and information fusion, improving the information processing efficiency of each server, so as to meet the office requirements of users.

Fourth Embodiment

Figure 4:
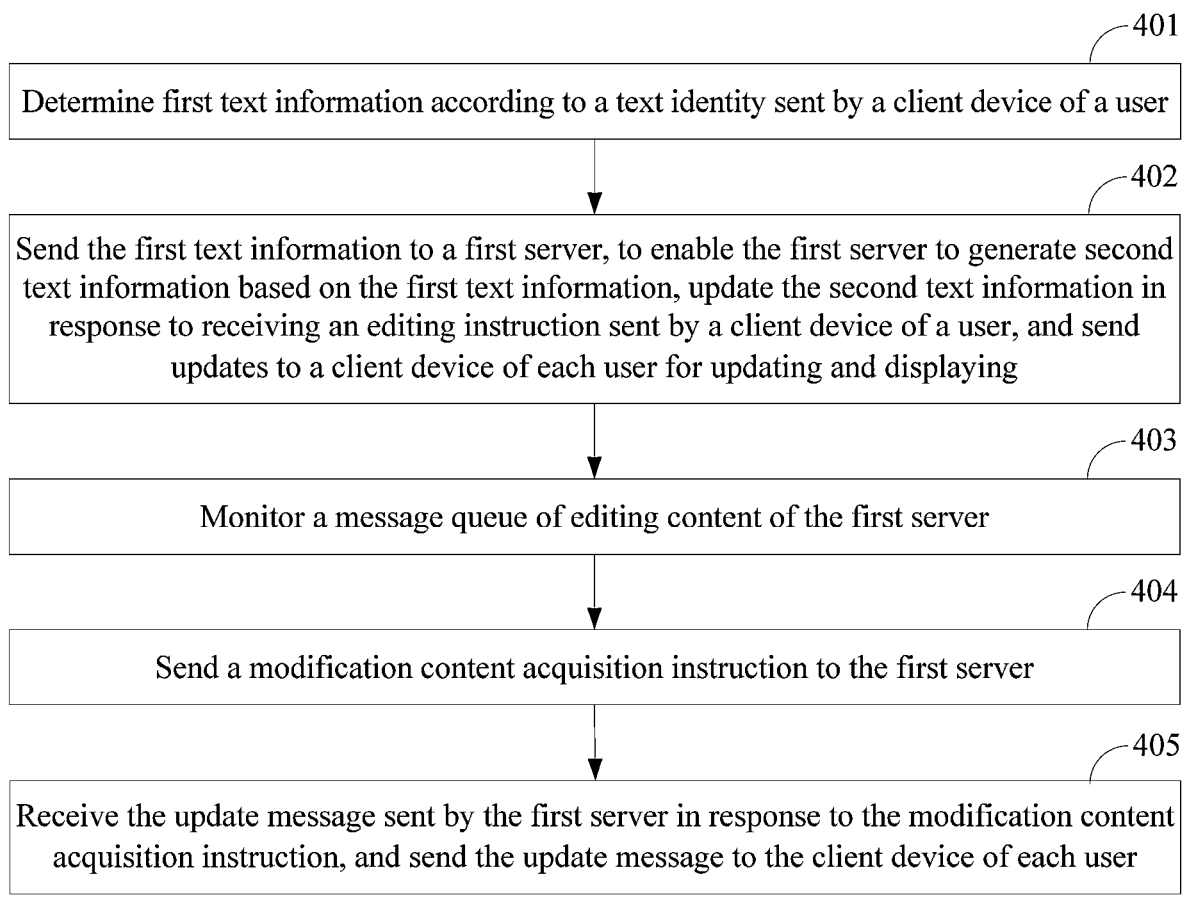
FIG. 4 is a schematic flow chart of a method for exchanging information according to a fourth embodiment of the present disclosure.

FIG. 4 is a schematic flow chart of a method for exchanging information according to a fourth embodiment of the present disclosure. The embodiment may be combined with the technical solutions the above embodiments. In the embodiment of the present disclosure, after the first text information is sent to the first server in the third embodiment, the method further includes: monitoring the message queue of the editing content in the first server, generating a modification content acquisition instruction when it is detected that the update message is added to the message queue of the editing content, sending the modification content acquisition instruction to the first server, receiving the update message sent by the first server in response to the modification content acquisition instruction, and sending the update message to client device of each user.

In step 401, first text information is determined according to a text identity sent by a client device of a user.

In an embodiment, the first text information may include a mail draft, and second text information may include a shared document. In the following description, the mail draft is taken as a representative of the first text information, and the shared document is taken as a representative of the second text information.

In step 402, the first text information is sent to the first server, to enable the first server to generate the second text information based on the first text information, the second text information is updated in response to receiving an editing instruction sent by a client device of a user, and updates are sent to a client device of each user for updating and displaying.

In step 403, the message queue of the editing content in the first server is monitored, and the modification content acquisition instruction is generated when it is detected that the update message is added to the message queue of the editing content.

The update message is generated based on content of a preset number of words in the updates of the shared document. The preset number of words may be first ten words in the updates. The preset number of words is not limited in the embodiment of the present disclosure.

For example, the document server in the embodiment may further acquire an update message by intercepting a preset number of words in the updates of the second text information (that is, the shared document), and add the update message to the message queue of the editing content for saving. The message queue of the editing content is used to save update message acquired at each time instant in real time. The mail server monitors the message queue of the document server, and generates a modification content acquisition instruction when detecting that an update message is added to the message queue of the editing content.

It should be noted that the mail server may monitor in real time or regularly. In a case that the mail server regularly monitors the message queue, the mail server generates the modification content acquisition instruction when detecting that the message queue is updated, and then sends the modification content acquisition instruction to the document server, so as to save the power consumption of the mail server. The manner of the generation of the modification content acquisition instruction is not limited in the embodiment.

In step 404, the modification content acquisition instruction is sent to the first server.

In step 405, the update message sent by the first server in response to the modification content acquisition instruction is received, and the update message is sent to the client device of each user.

The mail server in the embodiment receives the update message fed back by the document server in response to the modification content acquisition instruction, and sends the update message to the client device of each user, so that the client device of each user can display the update message at the subject location of the mail draft in the mail list.

In the method for exchanging information according to the embodiment of the present disclosure, the first server operates in cooperation with the second server, so that different servers can achieve information exchange and information fusion, improving the information processing efficiency of each server, so as to meet the office requirements of users. Moreover, the update message is acquired by monitoring the message queue of the editing content in the document server, and is sent to the client device of each user for displaying, so that the user can quickly find a current modification location in the mail draft according to the displayed update message, thereby further improving the user experience effect.

Fifth Embodiment

Figure 5:
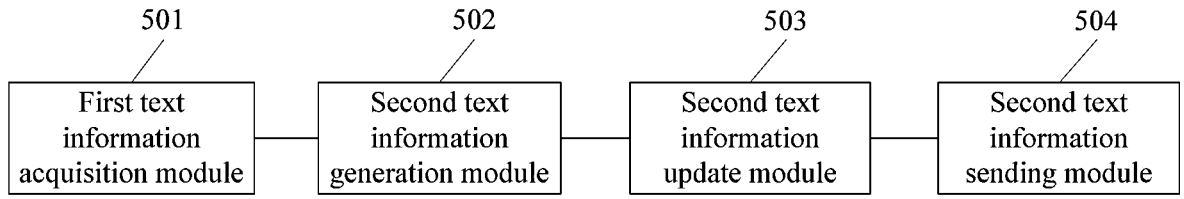
FIG. 5 is a schematic structural diagram of an apparatus for exchanging information according to a fifth embodiment of the present disclosure.

FIG. 5 is a schematic structural diagram of an apparatus for exchanging information according to a fifth embodiment of the present disclosure. The apparatus may be implemented in a form of software and/or hardware, and may normally be integrated in a document server performing the method. As shown in FIG. 5, the apparatus may include a first text information acquisition module 501, a second text information generation module 502, a second text information update module 503, and a second text information sending module 504.

The first text information acquisition module 501 is configured to receive first text information sent by a second server.

The second text information generation module 502 is configured to generate second text information based on the first text information.

The second text information update module 503 is configured to update, in response to receiving an editing instruction sent by a client device of a user, the second text information.

The second text information sending module 504 is configured to send updates of the second text information to a client device of each user, to enable the client device of each user to update the first text information according to the updates.

Further, the first text information includes a mail draft, and the second text information includes a shared document.

Further, the editing instruction includes editing content and a specified edit location. The second text information update module is configured to extract, in response to receiving the editing instruction sent by the client device of the user, the editing content and the specified edit location from the editing instruction; and update the shared document according to the editing content and the specified edit location.

Further, for updating the shared document according to the editing content and the specified edit location, the second text information update module is further configured to: add the editing content to the specified edit location of the shared document to update the shared document, where the specified edit location includes at least one of an address bar, a mail title, an attachment and a mail body of the mail draft.

Further, the second text information sending module 504 is further configured to: convert the updates of the shared document according to a preset data format, to make the converted updates of the shared document in conformity with a data format in which a first server communicates with the client device; and send the converted updates of the shared document to the client device of each user.

Further, the apparatus is further configured to: acquire an update message by intercepting a preset number of words in the updates of the shared document, and add the update message to a message queue of editing content; receive a modification content acquisition instruction sent by the second server, where the modification content acquisition instruction is generated when the second server detects that the update message is added to the message queue of the editing content; and send, in response to the modification content acquisition instruction, the update message to the second server, to enable the second server to send the update message to the client device of each user, where the update message is displayed at a location of subject of the mail draft in a mail list.

Further, the editing instruction further includes a user identity. The apparatus further includes an identity authentication module. The identity authentication module is configured to extract the user identity from the editing instruction; send the user identity to the second server to cause the second server to authenticate the user identity; and update, in response to an authentication pass instruction sent by the second server, the shared document.

Further, the apparatus further includes a mail sharing end instruction transmission module. The mail sharing end instruction transmission module is configured to receive a mail sharing end instruction sent by the second server; and send, in response to the mail sharing end instruction, a current mail draft to a client device of a user initiating the sharing.

The apparatus for exchanging information according to the embodiment of the present disclosure has the same invention concept as the method for exchanging information according to the above embodiments. For technical solutions not described in detail in the embodiment of the present disclosure, reference is made to the above embodiments, and the embodiment of the present disclosure has the same beneficial effect as the above embodiments.

Sixth Embodiment

Figure 6:
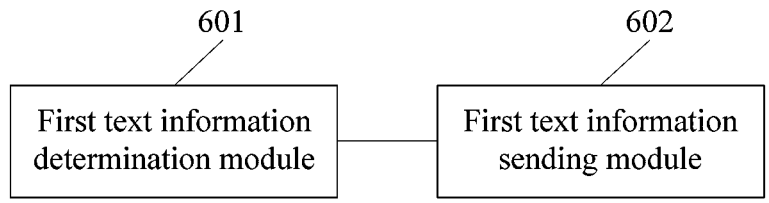
FIG. 6 is a schematic structural diagram of an apparatus for exchanging information according to a sixth embodiment of the present disclosure.

FIG. 6 is a schematic structural diagram of an apparatus for exchanging information according to a sixth embodiment of the present disclosure. The apparatus may be implemented in a form of software and/or hardware, and may generally be integrated in a document server performing the method. As shown in FIG. 6, the apparatus may include a first text information determination module 601 and a first text information sending module 602.

The first text information determination module 601 is configured to determine first text information according to a text identity sent by a client device of a user.

The first text information sending module 602 is configured to send the first text information to a first server, to enable the first server to generate second text information based on the first text information, update, in response to receiving an editing instruction sent by the client device of the user, the second text information, and send updates to a client device of each user for updating and displaying.

Further, the first text information includes a mail draft, and the second text information includes a shared document.

Further, the apparatus further includes a module for monitoring a message queue of editing content. The module for monitoring a message queue of editing content is configured to monitor a message queue of editing content in the first server, and generate a modification content acquisition instruction when determining that an update message is added to the message queue of the editing content, where the update message is generated based on content of a preset number of words in the updates of the shared document; send the modification content acquisition instruction to the first server; and receive the update message sent by the first server in response to the modification content acquisition instruction, and send the update message to the client device of each user, to enable the client device of each user to display the update message at a location of subject of the mail draft in a mail list.

Further, the apparatus further includes a mail sharing end instruction transmission module. The mail sharing end instruction transmission module is configured to send, on receipt of a mail sharing end instruction sent by a client device of a user, the mail sharing end instruction to the first server, to enable the first server to send, in response to the mail sharing end instruction, a current mail draft to a client device of a user initiating the sharing, and delete an update message recorded in a message queue of editing content.

The apparatus for exchanging information according to the embodiment of the present disclosure has the same invention concept as the method for exchanging information according to the above embodiments. For technical solutions not described in detail in the embodiment of the present disclosure, reference is made to the above embodiments, and the embodiment of the present disclosure has the same beneficial effect as the above embodiments.

Seventh Embodiment

Figure 7:
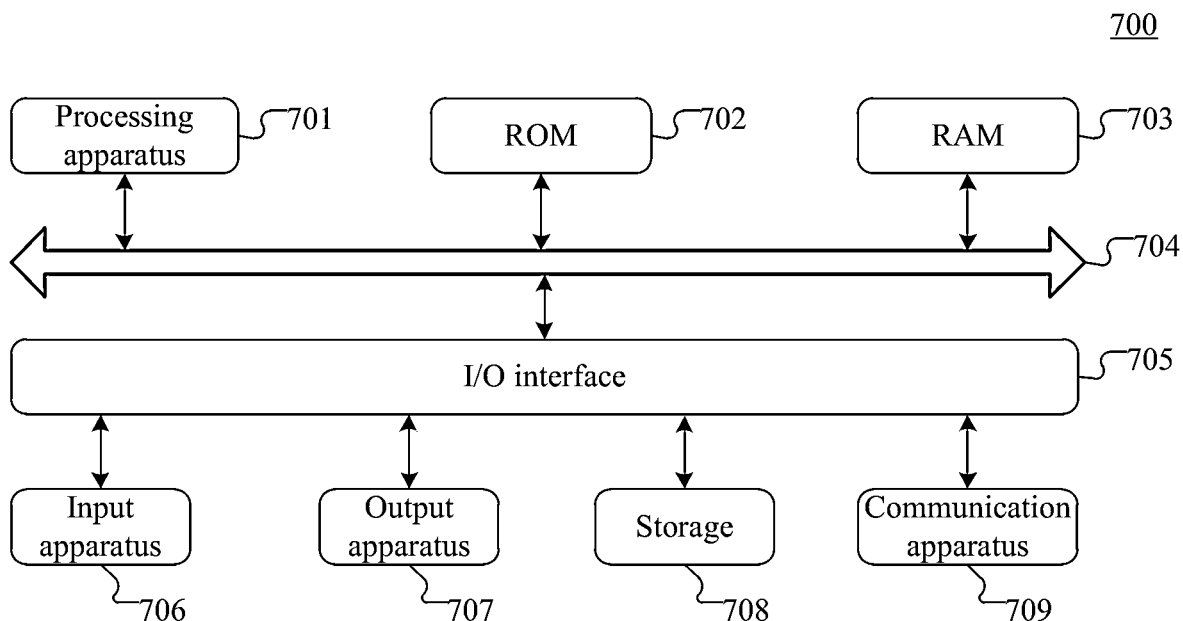
FIG. 7 is a schematic structural diagram of a first sever according to a seventh embodiment of the present disclosure.

Reference is made to FIG. 7, which is a schematic structural diagram of a first sever 700 applicable in implementing an embodiment of the present disclosure. A document server in the embodiment of the present disclosure may be a device corresponding to a back-end service platform of an application, or a mobile terminal device provided with an application client. The document server may include, but is not limited to, a mobile phone, a laptop, a digital broadcast receiver, a personal digital assistant (PDA), a tablet (PAD), a portable multimedia player (PMP), a vehicle-mounted terminals (such as an in-vehicle navigation terminal) and other mobile terminals and fixed terminals such as a digital TV, a desktop computer, and the like. The document server shown in FIG. 7 is only exemplary, and should not indicate any limitation to the function and scope of application of the embodiments of the present disclosure.

As shown in FIG. 7, the document server 700 may include a processing apparatus 701 (such as a central processing unit or a graphics processor), and may execute various operations and processing based on a program stored in a read only memory (ROM) 702 or a program loaded from a storage 708 into a random-access memory (RAM) 703. Various programs and data required for the operation of the document server 700 are stored in the RAM 703. The processing apparatus 701, the ROM 702 and the RAM 703 are connected to each other via a bus 704. An Input/output (I/O) interface 705 is also connected to the bus 704.

Generally, the I/O interface 705 may be connected to: an input apparatus 706, such as a touch screen, a touch panel, a keyboard, a mouse, a camera, a microphone, an accelerometer, and a gyroscope; an output apparatus 707, such as a liquid crystal display (LCD), a speaker, and a vibrator; a storage 708 such as a magnetic tape and a hard disk; and a communication apparatus 709. The communication apparatus 709 enables wireless or wired communication between the document server 700 and other devices for data exchanging. Although FIG. 7 shows various apparatuses included in the document server 700, it should be understood that the illustrated apparatuses are not necessarily required to all be implemented or included. Alternatively, more or fewer apparatuses may be implemented or included.

Particularly, according to an embodiment of the present disclosure, the process described above in conjunction with flow charts may be implemented as a computer program. For example, a computer program product is further provided as an embodiment in the present disclosure, including a computer program carried on a non-transient computer-readable medium. The computer program includes program codes for performing the method shown in the flow chart. In the embodiment, the computer program may be downloaded and installed from the network via the communication apparatus 709, or installed from the storage 708, or installed from the ROM 702. When the computer program is executed by the processing apparatus 701, the functions defined in the method according to the embodiment of the present disclosure are performed.

It should be noted that, the computer-readable medium according to the present disclosure may be a computer-readable signal medium or a computer-readable storage medium or any combination thereof. The computer-readable storage medium may be but is not limited to, a system, an apparatus, or a device in an electronic, magnetic, optical, electromagnetic, infrared, or semi-conductive form, or any combination thereof. The computer-readable storage medium may be, but is not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer-readable storage medium may be any tangible medium containing or storing a program, and the program may be used by or in combination with an instruction execution system, apparatus, or device. In the present disclosure, the computer-readable signal medium may be a data signal transmitted in a baseband or transmitted as a part of a carrier wave and carrying computer-readable program codes. The transmitted data signal may be in various forms, including but not limited to an electromagnetic signal, an optical signal or any proper combination thereof. The computer-readable signal medium may further be any computer-readable medium other than the computer-readable storage medium, and can send, propagate or transmit programs to be used by or in combination with an instruction execution system, apparatus or device. The program codes stored in the computer-readable medium may be transmitted via any proper medium including but not limited to a wire, an optical cable, radio frequency (RF) and the like, or any proper combination thereof.

In some embodiments, the client device and the server may communicate through any currently known or future developed network protocol such as hypertext transfer protocol (HTTP), and may be interconnected with any form or medium of digital data communication (such as, communication network). The communication network includes, for example, local area network (LAN), wide area network (WAN), Internet, and end-to-end network (such as, ad hoc end-to-end network), as well as any currently known or future developed networks.

Eight Embodiment

Figure 8:
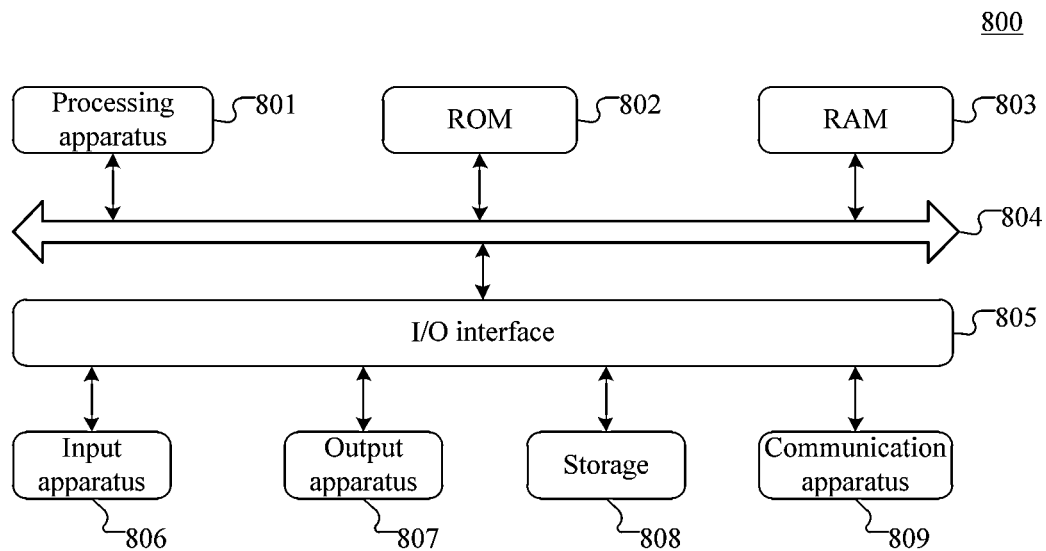
FIG. 8 is a schematic structural diagram of a second sever according to an eighth embodiment of the present disclosure.

Reference is made to FIG. 8, which is a schematic structural diagram of a second sever 800 according to an embodiment of the present disclosure. A mail server in the embodiment of the present disclosure may be a device corresponding to a back-end service platform of an application, or a mobile terminal device provided with an application client. The mail server may include, but is not limited to, a mobile phone, a laptop, a digital broadcast receiver, a personal digital assistant (PDA), a tablet (PAD), a portable multimedia player (PMP), a vehicle-mounted terminals (such as an in-vehicle navigation terminal) and other mobile terminals and fixed terminals such as a digital TV, a desktop computer, and the like. The mail server shown in FIG. 8 is only exemplary, and should not indicate any limitation to the function and scope of application of the embodiments of the present disclosure.

As shown in FIG. 8, the mail server 800 may include a processing apparatus 801 (such as a central processing unit or a graphics processor), and may execute various operations and processing based on a program stored in a read only memory (ROM) 802 or a program loaded from a storage 808 into a random-access memory (RAM) 803. Various programs and data required for the operation of the mail server 800 are stored in the RAM 803. The processing apparatus 801, the ROM 802 and the RAM 803 are connected to each other via a bus 804. An Input/output (I/O) interface 805 is also connected to the bus 804.

Generally, the I/O interface 805 may be connected to: an input apparatus 806, such as a touch screen, a touch panel, a keyboard, a mouse, a camera, a microphone, an accelerometer, and a gyroscope; an output apparatus 807, such as a liquid crystal display (LCD), a speaker, and a vibrator; a storage 808 such as a magnetic tape and a hard disk; and a communication apparatus 809. The communication apparatus 809 enables wireless or wired communication between the mail server 800 and other devices for data exchanging. Although FIG. 8 shows various apparatuses included in the mail server 800, it should be understood that the illustrated apparatuses are not necessarily required to all be implemented or included. Alternatively, more or fewer apparatuses may be implemented or included.

Particularly, according to an embodiment of the present disclosure, the process described above in conjunction with flow charts may be implemented as a computer program. For example, a computer program product is further provided as an embodiment in the present disclosure, including a computer program carried on a non-transient computer-readable medium. The computer program includes program codes for performing the method shown in the flow chart. In the embodiment, the computer program may be downloaded and installed from the network via the communication apparatus 809, or installed from the storage 808, or installed from the ROM 802. When the computer program is executed by the processing apparatus 801, the functions defined in the method according to the embodiment of the present disclosure are performed.

It should be noted that, the computer-readable medium according to the present disclosure may be a computer-readable signal medium or a computer-readable storage medium or any combination thereof. The computer-readable storage medium may be but is not limited to, a system, an apparatus, or a device in an electronic, magnetic, optical, electromagnetic, infrared, or semi-conductive form, or any combination thereof. The computer-readable storage medium may be, but is not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer-readable storage medium may be any tangible medium containing or storing a program, and the program may be used by or in combination with an instruction execution system, apparatus, or device. In the present disclosure, the computer-readable signal medium may be a data signal transmitted in a baseband or transmitted as a part of a carrier wave and carrying computer-readable program codes. The transmitted data signal may be in various forms, including but not limited to an electromagnetic signal, an optical signal or any proper combination thereof. The computer-readable signal medium may further be any computer-readable medium other than the computer-readable storage medium, and can send, propagate or transmit programs to be used by or in combination with an instruction execution system, apparatus or device. The program codes stored in the computer-readable medium may be transmitted via any proper medium including but not limited to a wire, an optical cable, radio frequency (RF) and the like, or any proper combination thereof.

In some embodiments, the client device and the server may communicate through any currently known or future developed network protocol such as hypertext transfer protocol (HTTP), and may be interconnected with any form or medium of digital data communication (such as, communication network). The communication network includes, for example, local area network (LAN), wide area network (WAN), Internet, and end-to-end network (such as, ad hoc end-to-end network), as well as any currently known or future developed networks.

Ninth Embodiment

Figure 9:
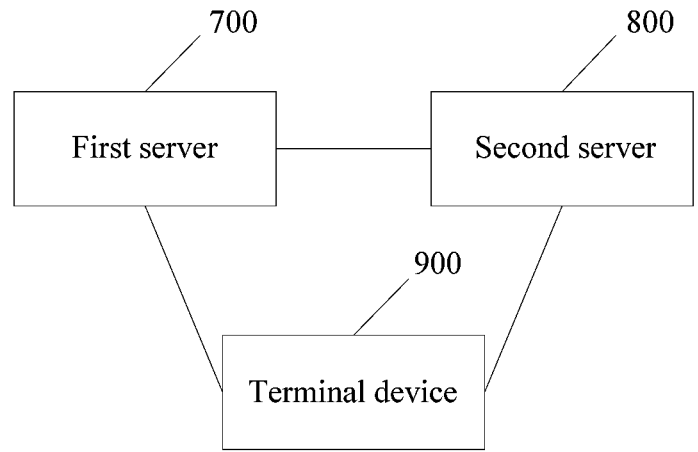
FIG. 9 is a schematic structural diagram of a system for exchanging information according to a ninth embodiment of the present disclosure.

FIG. 9 is a schematic structural diagram of a system for exchanging information according to a ninth embodiment of the present disclosure. As shown in FIG. 9, the system includes a first server 700 and a second server 800. For a structure of the first server 700, reference is made to the seventh embodiment. For a structure of the second server 800, reference is made to the eighth embodiment.

The first server is in communication connection with the second server in the embodiment, so as to achieve the method for exchanging information described in the first embodiment to the fourth embodiment.

A terminal device 900 in communication connection with the first server and the second server respectively is further provided according to the embodiment, and the mail client and the client device of the user may run on the terminal device 900.

It should be noted that the first server and the second server in the embodiment may be physically independent or physically unified but logically separated.

Tenth Embodiment

The computer-readable medium may be included in the document server or the mail server. Alternatively, the computer-readable medium may exist independently without being installed into the document server or the mail server.

The computer-readable medium carries one or more programs. When the one or more programs are executed by the document server, internal process in the document server performs: receiving first text information sent by a second server; generating second text information based on the first text information; updating, in response to receiving an editing instruction sent by a client device of a user, the second text information; and sending updates of the second text information to a client device of each user, to enable the client device of each user to update the first text information according to the updates.

Alternatively, the computer-readable medium carries one or more programs. When the one or more programs are executed by the mail server, internal process in the mail server performs: determining first text information according to a text identity sent by a client device of a user; and sending the first text information to a first server, to enable the first server to generate second text information based on the first text information, update, in response to receiving an editing instruction sent by a client device of a user, the second text information, and send updates to a client device of each user for updating and displaying.

The computer program codes for performing the operations disclosed in the embodiments of the present disclosure may be written in one or more programming languages or combinations thereof. The programming languages include but not limited to an object-oriented programming language, such as Java, Smalltalk, and C++, and a conventional procedural programming language, such as C language or a similar programming language. The program codes may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block diagrams in the drawings illustrate the architecture, functions and operations that can be implemented by the system, method and computer program product according to the embodiments of the present disclosure. Each block in a flow chart or a block diagram may represent a module, a program segment, or a part of code, and part of the module, program segment, or part of code includes one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or actions, or may be realized by a combination of dedicated hardware and computer instructions.

The modules or units mentioned in the description of the embodiments of the present disclosure may be implemented by means of software, or otherwise by means of hardware. A name of the module or unit does not constitute a limitation to the module or unit in some cases.

The functions described above herein may be performed at least partially by one or more hardware logic components. For example, non-limiting, exemplary types of hardware logic components that can be used include: field programmable gate array (FPGA), application specific integrated circuit (ASIC), application specific standard product (ASSP), system on chip (SOC), complex programmable logic device (CPLD), and so on.

In the context of the present disclosure, a machine-readable medium may be a tangible medium that may include or store a program for use by an instruction execution system, apparatus, or device, or in combination with an instruction execution system, apparatus, or device. The machine-readable medium may be a machine-readable signal medium or a machine-readable storage medium. The machine-readable medium may include, but is not limited to, a system, an apparatus, or a device in an electronic, magnetic, optical, electromagnetic, infrared, or semi-conductive form, or any combination thereof. The machine-readable storage media may further include an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof.

A method for exchanging information is provided according to one or more embodiments of the present disclosure, the method includes:

receiving first text information sent by a second server;
generating second text information based on the first text information;
updating, in response to receiving an editing instruction sent by a client device of a user, the second text information; and
sending updates of the second text information to a client device of each user, to enable the client device of each user to update the first text information according to the updates.

According to one or more embodiments of the present disclosure, in the method, the first text information includes a mail draft, and the second text information includes a shared document.

According to one or more embodiments of the present disclosure, in the method, the editing instruction includes editing content and a specified edit location, and the updating, in response to receiving an editing instruction sent by a client device of a user, the second text information includes:
extracting, in response to receiving the editing instruction sent by the client device of the user, the editing content and the specified edit location from the editing instruction; and
updating the shared document according to the editing content and the specified edit location.

According to one or more embodiments of the present disclosure, in the method, updating the shared document according to the editing content and the specified edit location includes: adding the editing content at the specified edit location of the shared document to update the shared document, where the specified edit location includes at least one of an address bar, a mail title, an attachment and a mail body of the mail draft.

According to one or more embodiments of the present disclosure, in the method, the sending updates of the second text information to a client device of each user includes: converting the updates of the shared document according to a preset data format, to make the converted updates of the shared document in conformity with a data format in which a first server communicates with the client device; and sending the converted updates of the shared document to the client device of each user.

According to one or more embodiments of the present disclosure, after updating, in response to receiving an editing instruction sent by a client device of a user, the second text information, the method further includes
acquiring an update message by intercepting a preset number of words in the updates of the shared document, and adding the update message to a message queue of editing content;
receiving a modification content acquisition instruction sent by the second server, where the modification content acquisition instruction is generated when the second server detects that the update message is added to the message queue of the editing content; and
sending, in response to the modification content acquisition instruction, the update message to the second server, to enable the second server to send the update message to the client device of each user, where the update message is displayed at a location of subject of the mail draft in a mail list.

According to one or more embodiments of the present disclosure, in the method, the editing instruction further includes a user identity, before updating the second text information, the method further includes extracting the user identity from the editing instruction; sending the user identity to the second server to cause the second server to authenticate the user identity; and updating, in response to an authentication pass instruction sent by the second server, the shared document.

According to one or more embodiments of the present disclosure, the method further includes receiving a mail sharing end instruction sent by the second server; and sending, in response to the mail sharing end instruction, a current mail draft to a client device of a user initiating the sharing.

A method for exchanging information is provided according to one or more embodiments of the present disclosure, the method is applied to the second server, and includes: determining first text information according to a text identity sent by a client device of a user; and sending the first text information to a first server, to enable the first server to generate second text information based on the first text information, update the second text information in response to receiving an editing instruction sent by a client device of a user, and send updates to a client device of each user for updating and displaying.

According to one or more embodiments of the present disclosure, in the method, the first text information includes a mail draft, and the second text information includes a shared document.

According to one or more embodiments of the present disclosure, the method further includes:
monitoring a message queue of editing content in the first server, and generating a modification content acquisition instruction when determining that an update message is added to the message queue of the editing content, where the update message is generated based on content of a preset number of words in the updates of the shared document;

sending the modification content acquisition instruction to the first server; and receiving the update message sent by the first server in response to the modification content acquisition instruction, and sending the update message to the client device of each user, to enable the client device of each user to display the update message at a location of subject of the mail draft in a mail list.

According to one or more embodiments of the present disclosure, the method further includes: sending, on receipt of a mail sharing end instruction sent by a client device of a user, the mail sharing end instruction to the first server, to enable the first server to send, in response to the mail sharing end instruction, a current mail draft to a client device of a user initiating the sharing, and delete an update message recorded in a message queue of editing content.

An apparatus for exchanging information is provided according to one or more embodiments of the present disclosure, the apparatus includes:

a first text information acquisition module, configured to receive first text information sent by a second server;

a second text information generation module, configured to generate second text information based on the first text information;

a second text information update module, configured to update, in response to receiving an editing instruction sent by a client device of a user, the second text information; and a second text information sending module, configured to send updates of the second text information to a client device of each user, to enable the client device of each user to update the first text information according to the updates.

An apparatus for exchanging information is provided according to one or more embodiments of the present disclosure, the apparatus includes:

a first text information determination module, configured to determine first text information according to a text identity sent by a client device of a user; and a first text information sending module, configured to send the first text information to a first server, to enable the first server to generate second text information based on the first text information, update, in response to receiving an editing instruction sent by a client device of a user, the second text information, and send updates to a client device of each user for updating and displaying.

A first server is provided is provided according to one or more embodiments of the present disclosure, the first server includes:

one or more processors; and a memory for storing one or more programs, where the one or more processors, when executing the one or more programs, perform the method for exchanging information according to the first embodiment and the second embodiment.

A second server is provided is provided according to one or more embodiments of the present disclosure, the second server includes:

one or more processors; and a memory for storing one or more programs, where the one or more processors, when executing the one or more programs, perform the method for exchanging information according to the third embodiment and the fourth embodiment.

A system for exchanging information is provided is provided according to one or more embodiments of the present disclosure, the system includes at least the first server according to the seventh embodiment and the second server according to the eighth embodiment.

A computer-readable storage medium is provided is provided according to one or more embodiments of the present disclosure. The computer-readable storage medium stores a computer program, and the program, when being executed by a processor, performs the method for exchanging information according to any one of the embodiments.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features (but not limited to) having similar functions disclosed in the present disclosure.

It should be noted that although the above operations are described in a specific order, it should not be understood that these operations are required to be performed in the specific order or performed in a sequential order. In some conditions, multitasking and parallel processing may be advantageous. Although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for exchanging information, comprising:

receiving, by a first server, first text information sent by a second server;

generating, by the first server, second text information based on the first text information;

updating, by the first server, in response to receiving an editing instruction sent by a client device of a user, the second text information; and sending, by the first server, updates of the second text information to a client device of each user, to enable the client device of each user to update the first text information according to the updates, wherein the first text information comprises a mail draft, and the second text information comprises a shared document, and after updating the second text information, the method further comprises:

acquiring an update message by intercepting a preset number of words in the updates of the shared document, and adding the update message to a message queue of editing content;

receiving a modification content acquisition instruction sent by the second server, wherein the modification content acquisition instruction is generated when the second server detects that the update message is added to the message queue of the editing content; and sending, in response to the modification content acquisition instruction, the update message to the second server, to enable the second server to send the update message to the client device of each user.

2. The method according to claim 1, wherein the editing instruction comprises editing content and specified edit location, and the updating, in response to receiving an editing instruction sent by a client device of a user, the second text information comprises:

extracting, by the first server, from the editing instruction, in response to receiving the editing instruction sent by the client device of the user, the editing content and the specified edit location; and updating, by the first server, the shared document according to the editing content and the specified edit location.

3. The method according to claim 2, wherein the updating the shared document according to the editing content and the specified edit location comprises:

adding, by the first server, the editing content at the specified edit location of the shared document to update the shared document, wherein the specified edit location comprises at least one of: an address bar of the mail draft, a mail title of the mail draft, an attachment of the mail draft, and a mail body of the mail draft.

4. The method according to claim 1, wherein the sending updates of the second text information to a client device of each user comprises:

converting, by the first server, the updates of the shared document according to a preset data format, to make the converted updates of the shared document in conformity with a data format in which the first server communicates with the client device; and sending, by the first server, the converted updates of the shared document to the client device of each user.

5. The method according to claim 1,
wherein the update message is displayed at a location of subject of the mail draft in a mail list.

6. The method according to claim 1, wherein the editing instruction further comprises a user identity, and before updating the second text information, the method further comprises:

extracting, by the first server, the user identity from the editing instruction;

sending, by the first server, the user identity to the second server to cause the second server to authenticate the user identity; and updating, by the first server, in response to an authentication pass instruction sent by the second server, the shared document.

7. The method according to claim 6, further comprising:
receiving, by the first server, a mail sharing end instruction sent by the second server; and sending, by the first server, in response to the mail sharing end instruction, a current mail draft to a client device of a user initiating the sharing.

8. A method for exchanging information, comprising:
determining, by a second server, first text information according to a text identity sent by a client device of a user;

sending, by the second server, the first text information to a first server, to enable the first server to generate second text information based on the first text information, and to enable the first server to update the second text information in response to receiving an editing instruction sent by the client device of the user, and to enable the first server to send updates to a client device of each user for updating and displaying;

wherein the first text information comprises a mail draft, and the second text information comprises a shared document, and the method further comprises:

monitoring a message queue of editing content in the first server, and generating a modification content acquisition instruction when determining that an update message is added to the message queue of the editing content, wherein the update message is generated based on content of a preset number of words in the updates of the shared document;

sending the modification content acquisition instruction to the first server; and receiving the update message sent by the first server in response to the modification content acquisition instruction, and sending the update message to the client device of each user, to enable the client device of each user to display the update message.

9. The method according to claim 8, further comprising:
sending, by the second server, on receipt of a mail sharing end instruction sent by the client device of the user, the mail sharing end instruction to the first server, to enable the first server to send, in response to the mail sharing end instruction, a current mail draft to a client device of a user initiating the sharing, and delete, by the second server, the update message recorded in the message queue of editing content.

10. An apparatus for exchanging information, applied in a first server, comprising:
one or more processors; and
a memory for storing one or more programs, wherein the one or more processors, when executing the one or more programs, are caused to:

receive first text information sent by a second server;
generate second text information based on the first text information;

update, in response to receiving an editing instruction sent by a client device of a user, the second text information; and send updates of the second text information to a client device of each user, to enable the client device of each user to update the first text information according to the updates, wherein the first text information comprises a mail draft, and the second text information comprises a shared document, and the one or more processors, when executing the one or more programs, are further caused to perform:

acquiring an update message by intercepting a preset number of words in the updates of the shared document, and adding the update message to a message queue of editing content;

receiving a modification content acquisition instruction sent by the second server, wherein the modification content acquisition instruction is generated when the second server detects that the update message is added to the message queue of the editing content; and sending, in response to the modification content acquisition instruction, the update message to the second server, to enable the second server to send the update message to the client device of each user.

11. The apparatus according to claim 10, wherein the editing instruction comprises editing content and a specified edit location, and the one or more processors, when executing the one or more programs, are further caused to perform:

extracting from the editing instruction, in response to receiving the editing instruction sent by the client device of the user, the editing content and the specified edit location; and updating the shared document according to the editing content and the specified edit location.

12. The apparatus according to claim 11, wherein the one or more processors, when executing the one or more programs, are further caused to perform:

adding the editing content at the specified edit location of the shared document to update the shared document, wherein the specified edit location comprises at least one of: an address bar of the mail draft, a mail title of the mail draft, an attachment of the mail draft, and a mail body of the mail draft.

13. The apparatus according to claim 10, wherein the one or more processors, when executing the one or more programs, are further caused to perform:

converting the updates of the shared document according to a preset data format, to make the converted updates of the shared document in conformity with a data format in which a first server communicates with the client device; and sending the converted updates of the shared document to the client device of each user.

14. An apparatus for exchanging information, applied in a second server, comprising:

one or more processors; and a memory for storing one or more programs, wherein the one or more processors, when executing the one or more programs, are caused to:

determine first text information according to a text identity sent by a client device of a user; and send the first text information to a first server, to enable the first server to generate second text information based on the first text information, to enable the first server to update the second text information in response to receiving an editing instruction sent by the client device of the user, and to enable the first server to send updates to a client device of each user for updating and displaying, wherein the first text information comprises a mail draft, and the second text information comprises a shared document, and the one or more processors, when executing the one or more programs, are further caused to perform:

monitoring a message queue of editing content in the first server, and generating a modification content acquisition instruction when determining that an update message is added to the message queue of the editing content, wherein the update message is generated based on content of a preset number of words in the updates of the shared document;

sending the modification content acquisition instruction to the first server; and receiving the update message sent by the first server in response to the modification content acquisition instruction, and sending the update message to the client device of each user, to enable the client device of each user to display the update message.

15. The apparatus according to claim 14, wherein the one or more processors, when executing the one or more programs, are further caused to perform:

sending, on receipt of a mail sharing end instruction sent by the client device of the user, the mail sharing end instruction to the first server, to enable the first server to send, in response to the mail sharing end instruction, a current mail draft to a client device of a user initiating the sharing, and delete the update message recorded in the message queue of editing content.

* * * * *